United States Patent [19]

Akaura et al.

[11] 4,152,798
[45] May 8, 1979

[54] CORK LINE HAVING FOAMED THERMOPLASTIC RESIN FLOATS INTEGRALLY BONDED TO A LEADER AND A PROCESS FOR PRODUCING SAME

[75] Inventors: Seshiro Akaura; Yasushi Nagamune; Takeshi Nakamura, all of Settsu, Japan

[73] Assignee: (Ashimoro Industry, Co., Ltd.) Ashimori Kogyo Kabushiki Kaisha, Osaka, Japan

[21] Appl. No.: 791,649

[22] Filed: Apr. 27, 1977

[30] Foreign Application Priority Data

Apr. 27, 1976 [JP] Japan .................................. 51-48739

[51] Int. Cl.² ........................ B29D 27/00; B63B 21/52
[52] U.S. Cl. ........................................ 9/8 R; 264/45.5; 264/46.4; 264/46.9; 264/251; 264/297; 264/328; 264/DIG. 14; 264/DIG. 83
[58] Field of Search ...................... 264/46.6, 46.7, 251, 264/297, 46.9, 45.5, DIG. 83, DIG. 14, 328; 9/8 R, 14, 310 C; 43/7, 9, 43.14

[56] References Cited

U.S. PATENT DOCUMENTS

| | | | |
|---|---|---|---|
| 2,465,656 | 3/1949 | Morin | 264/251 |
| 2,744,289 | 5/1956 | Wanders | 264/251 X |
| 2,920,354 | 1/1960 | Zumbrunnen | 264/251 X |
| 3,268,636 | 8/1966 | Angell | 264/DIG. 83 |
| 3,269,047 | 8/1966 | Slattery | 43/7 |
| 3,511,736 | 5/1970 | Nielsen et al. | 264/46.9 X |
| 3,578,763 | 5/1971 | Platou | 43/9 X |
| 3,879,780 | 4/1975 | Williams | 9/8 R |
| 4,000,532 | 1/1977 | Nielsen | 9/8 R |
| 4,009,237 | 2/1977 | Kimura et al. | 264/46.7 X |

FOREIGN PATENT DOCUMENTS

| | | | |
|---|---|---|---|
| 1037904 | 8/1958 | Fed. Rep. of Germany | 9/14 |
| 1006605 | 4/1952 | France | 264/251 |
| 46-7470 | 2/1971 | Japan | 264/DIG. 83 |
| 1419952 | 12/1975 | United Kingdom | 9/8 R |
| 1426638 | 3/1976 | United Kingdom | 9/8 R |
| 1456312 | 11/1976 | United Kingdom | 264/251 |

*Primary Examiner*—Philip Anderson
*Attorney, Agent, or Firm*—Birch, Stewart, Kolasch and Birch

[57] ABSTRACT

A process for producing cork lines which comprises holding a leader or leaders with a pair of metal molds having at the junctional surfaces thereof one or more cavities for forming a float or floats and one or more furrows formed so as to pass through said cavity or cavities for holding said leader or leaders, injecting a molten synthetic resin mixed with a foaming agent into said cavity or cavities to effect molding and foaming of said resin, cooling said metal molds and taking out a flat or floats integrally fixed to said leader or leaders from said metal molds. An apparatus for producing cork lines which comprises an injection molding machine having a pair of metal molds with a cavity or cavities to form a float or floats and with furrows formed so as to pass through said cavity or cavities for holding a leader or leaders on the junctional surfaces of sid metal molds, a device for maintaining said leader or leaders in stretched state between said metal molds and a device for intermittently conveying said leader or leaders in stretched state for a given distance in the longitudinal direction. A cork line thus produced can be used in various fields of industry, especially for fisheries.

19 Claims, 41 Drawing Figures

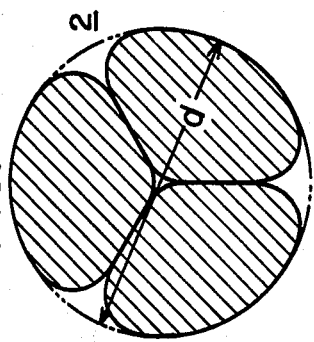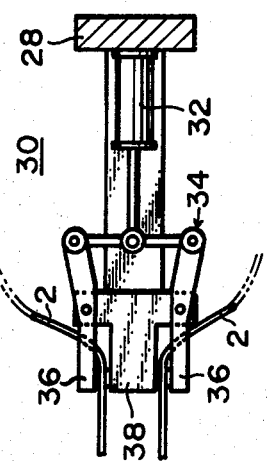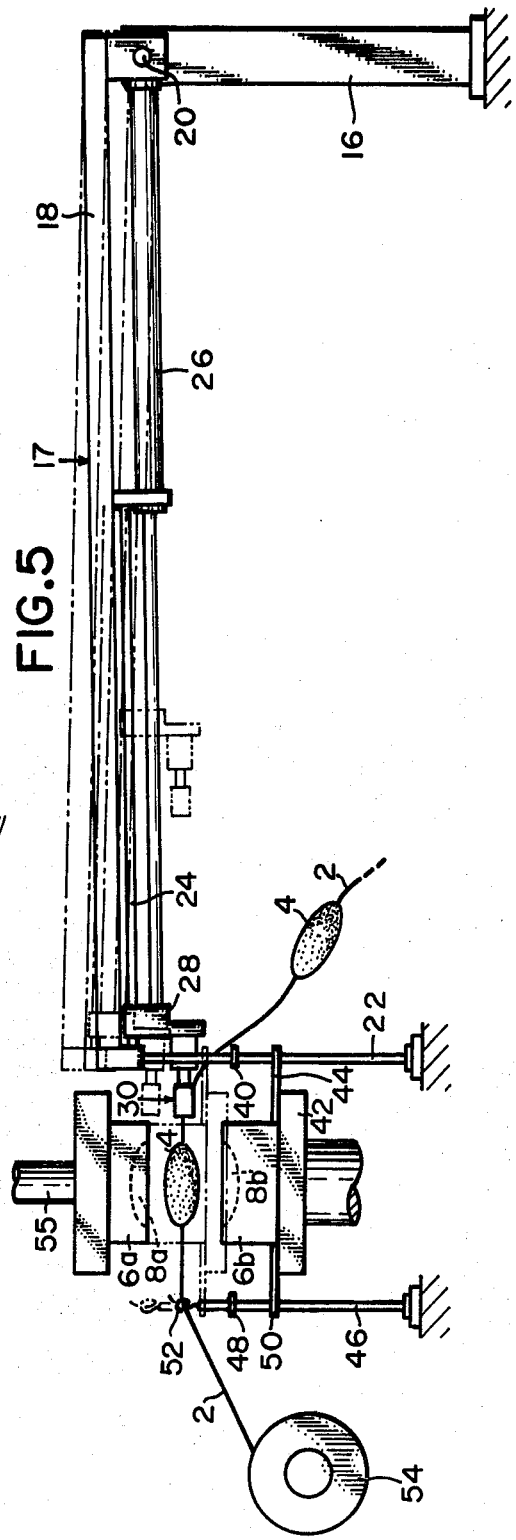

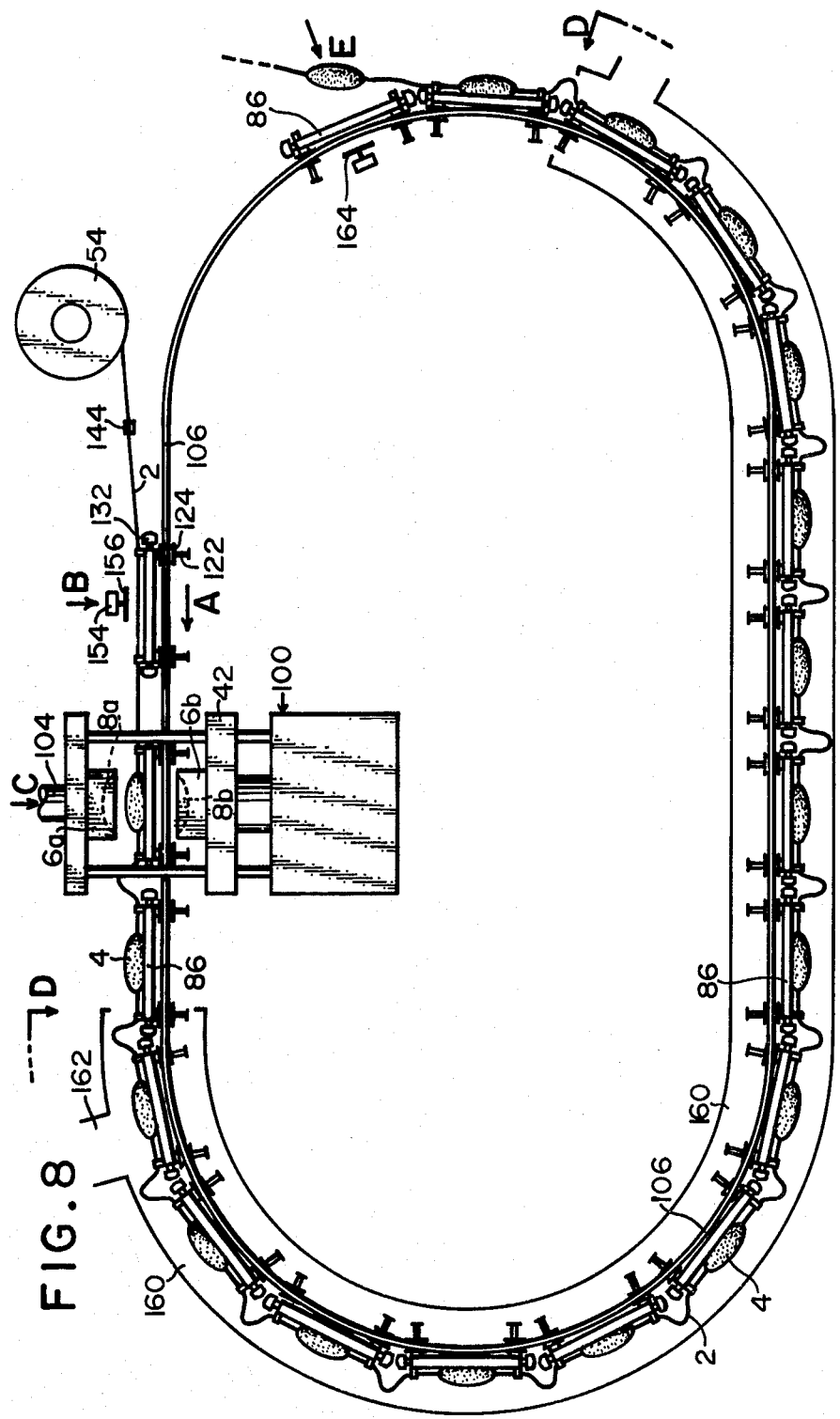

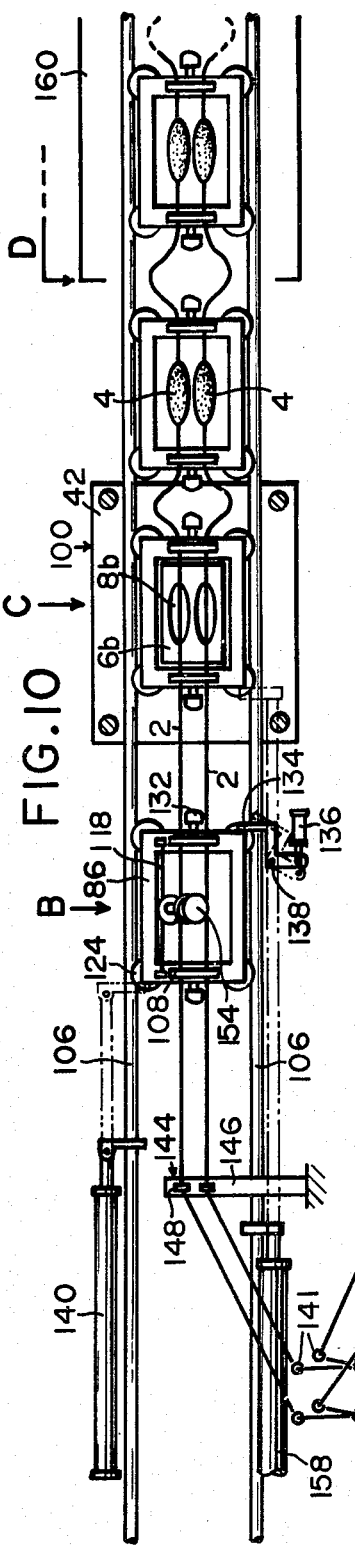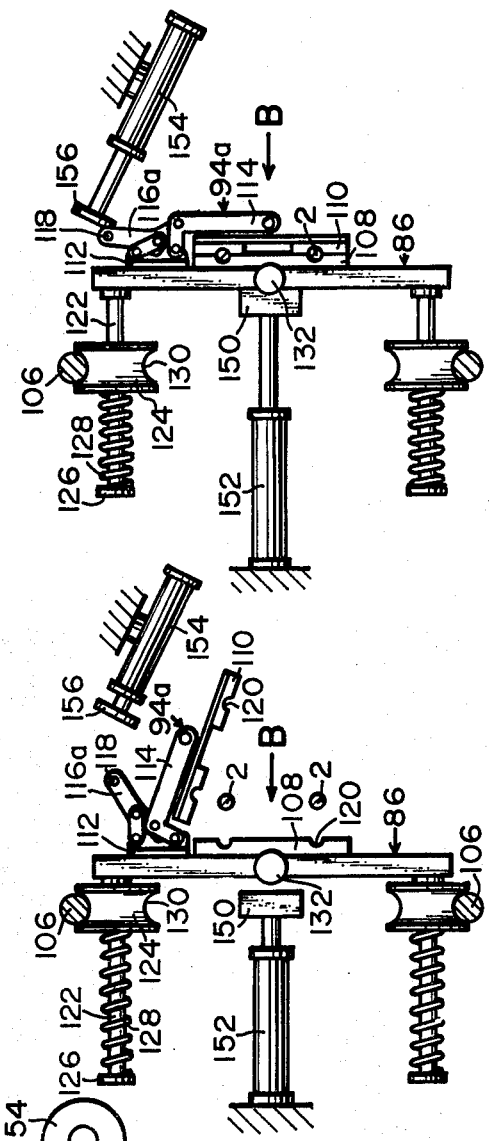

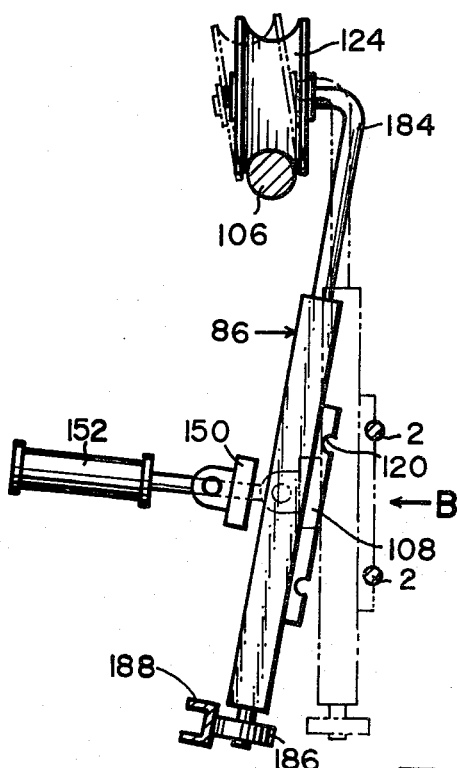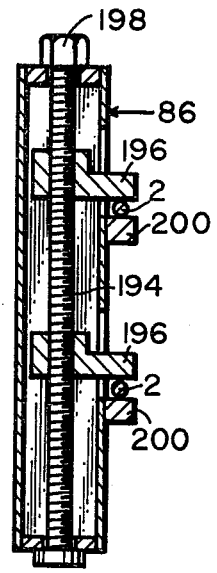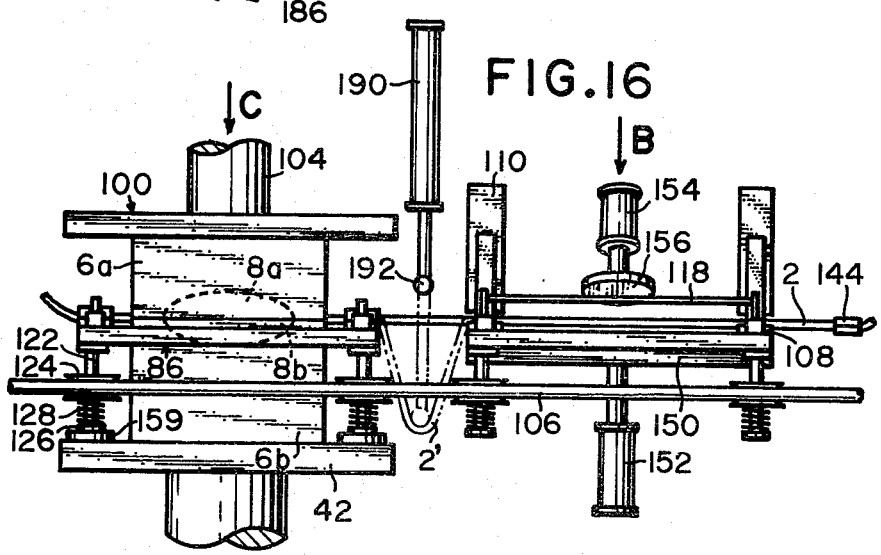

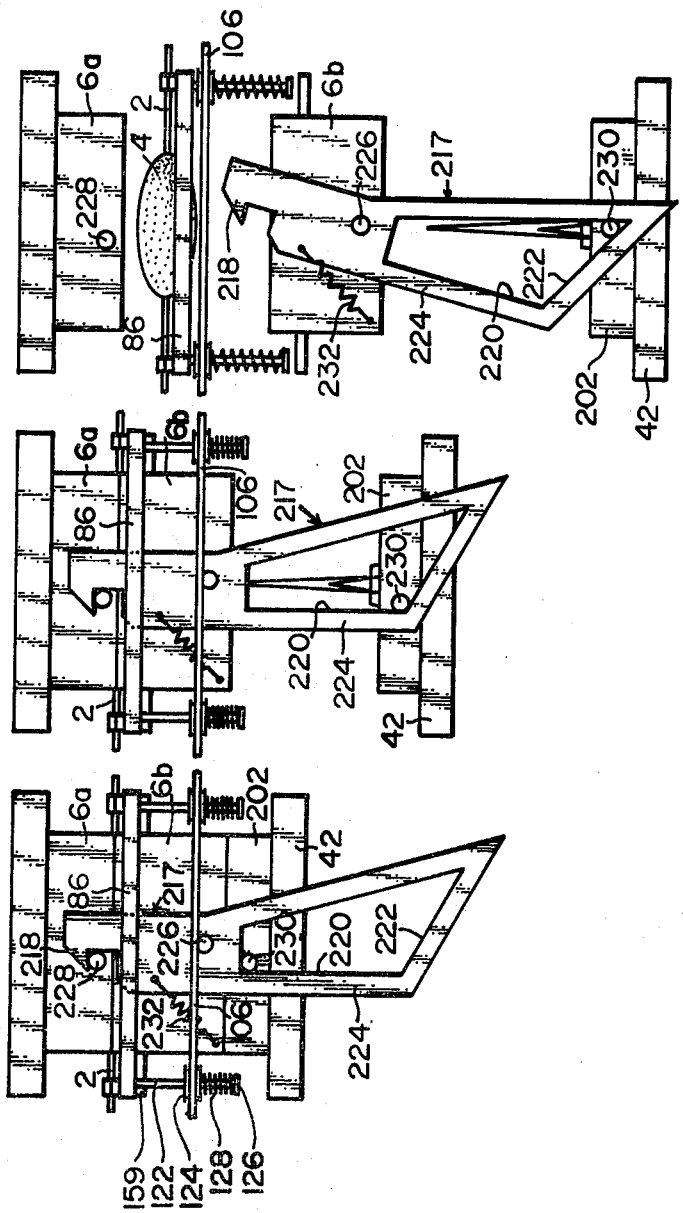

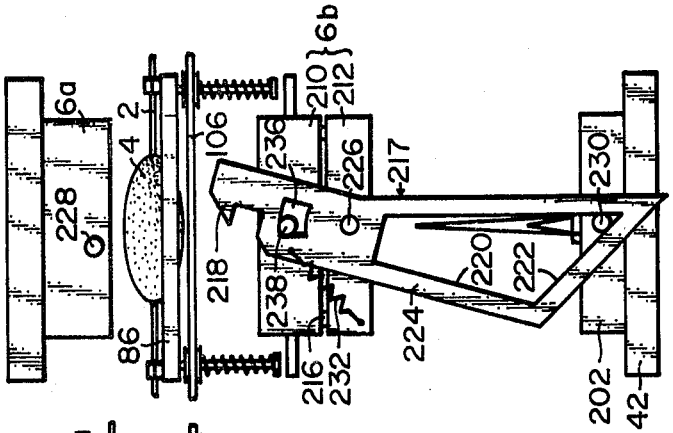
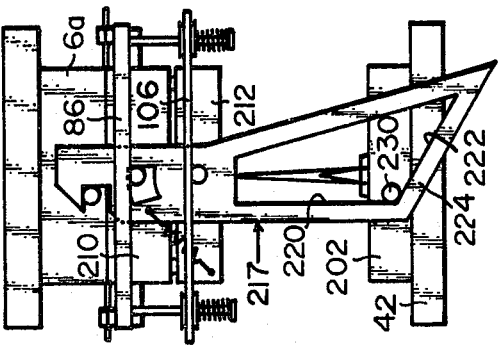
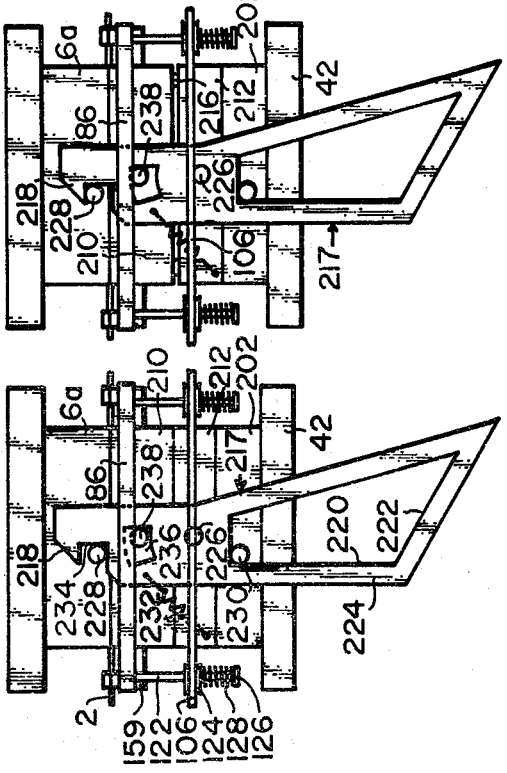

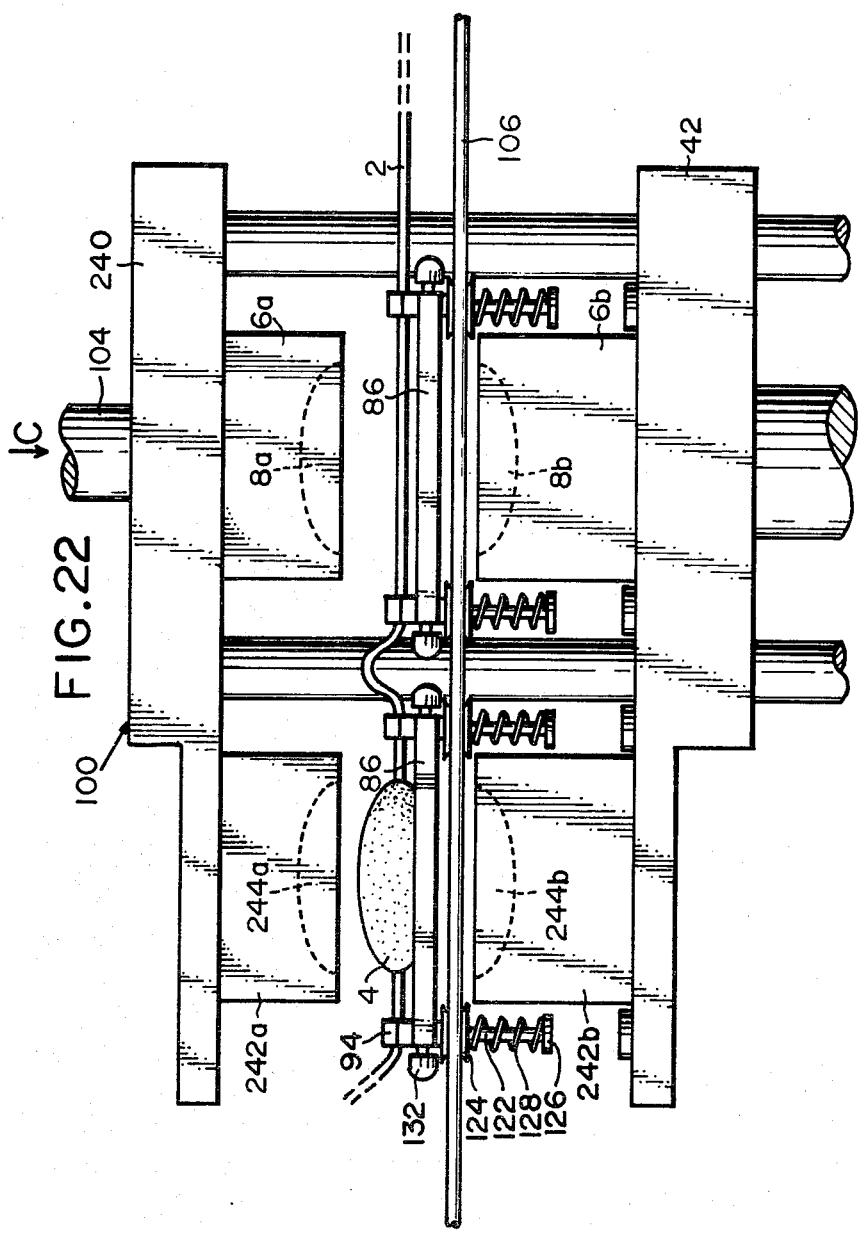

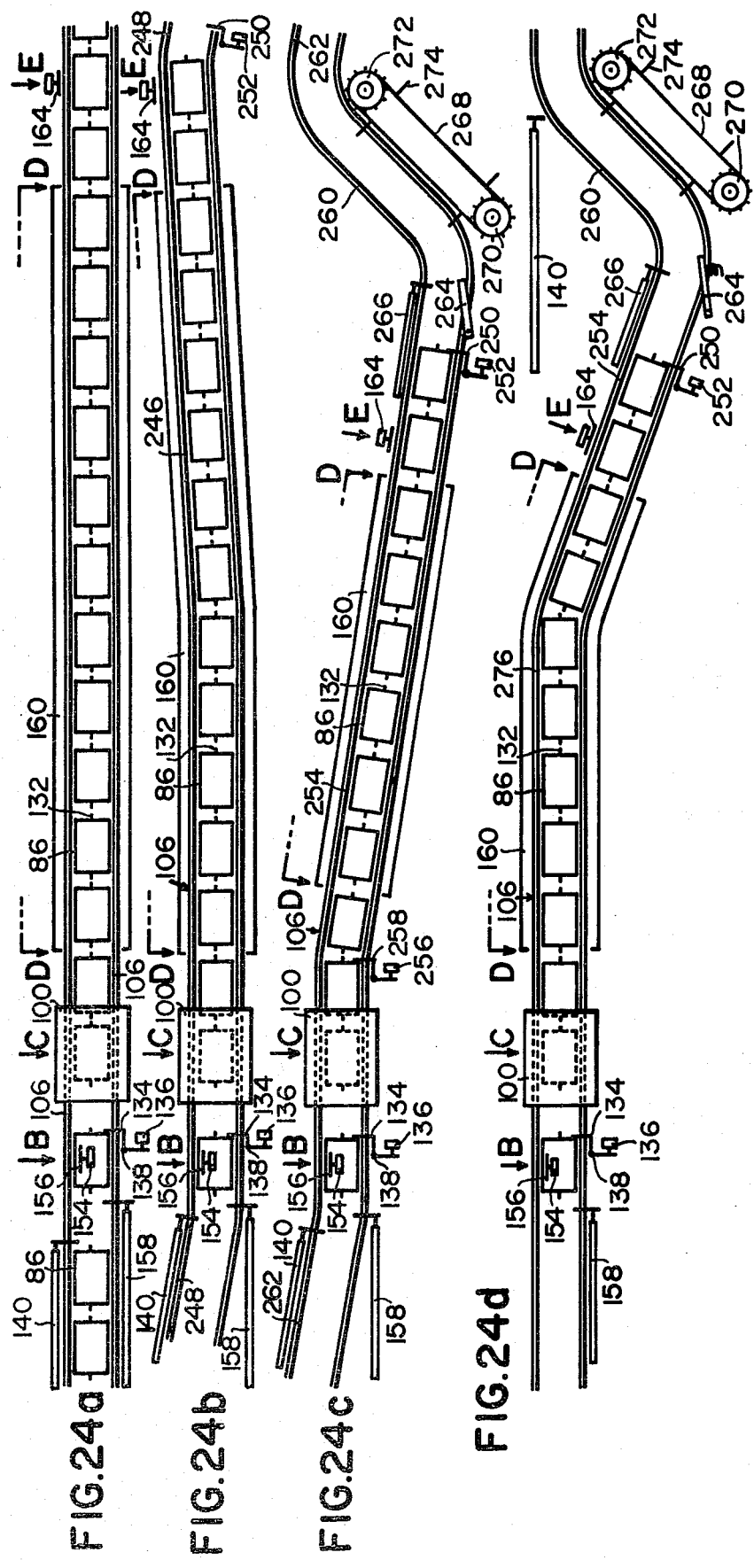

CORK LINE HAVING FOAMED THERMOPLASTIC RESIN FLOATS INTEGRALLY BONDED TO A LEADER AND A PROCESS FOR PRODUCING SAME

BACKGROUND OF THE INVENTION

The present invention relates to a cork line for use in fisheries and to a process for producing same.

In the prior arts, cork lines for use in fisheries wer generally those manufactured by making a rope and floats separately and binding the rope and floats by the aid of a string. However, the work for binding a rope with floats was extremely difficult and required skilled techniques. Furthermore, cork lines used in the prior arts in which a rope and floats are bound merely with a string have such a disadvantage that the floats are detached from the rope or their positions are dislocated due to breakage of the string on actual use.

To overcome such disadvantage there was also provided in the prior arts a cork line wherein floats are inserted into a braid rope thereby relieving workers from the trouble of binding floats with the rope. In the cork line of this type, however, the portion of the braid where each float is inserted inflates to make the bond of braid loosen, thus resulting in breakage of the braid by abrasion or friction encountered on winding or actual use. For these reasons, cork lines according to the prior arts could not stand actual rugged use eapecially for a prolonged period of time. In these circumstances, there is a great demand in fisheries for development of a new type cork line which entirely overcomes these drawbacks.

BRIEF SUMMARY OF THE INVENTION

It is an object of the present invention to provide a new cork line which comprises a leader (or rope) made of a fibrous material and floats of a synthetic resin fixed integrally by molding to the leader at definite intervals.

It is another object of the present invention to provide a new cork line which can be produced initially industrial scale and need not require any troublesome manual work for binding floats with a leader prior to actual use.

It is still another object of the present invention to provide a process for producing the new cork line which comprises subjecting a leader in stretched state to an injection molding treatment for integrally fixing floats of a synthetic resin to the leader at definite intervals.

It is further object of the present invention to utilize an apparatus for producing the new cork line which comprises an injection molding machine having a pair of metal molds with a cavity to from a float and with a furrow through which a leader is passed, a device for maintaining the leader in stretched state between the metal molds and a device for intermittently conveying the leader in stretched state for a given distance in the longitudinal direction.

Other objects, features and advantages of the present invention will become apparent more fully from the following description.

DETAILED DESCRIPTION OF THE INVENTION

It has now been found that the drawbacks of cork lines in the prior arts can entirely be overcome by fixing floats of a synthetic resin by injection molding to a leader at definite intervals. Since the new cork line of the present invention can be produced ab initio as a rope to which the floats are integrally fixed at definite intervals, there is no need of troublesome work for connecting a number of floats to a rope prior to actual use.

The present invention can more fully be understood from the following description taken in conjunction with the accompanying drawings in which.

Figure 3A:
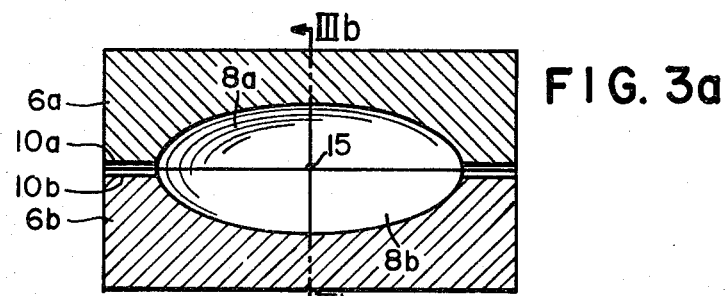
Figure 3B:
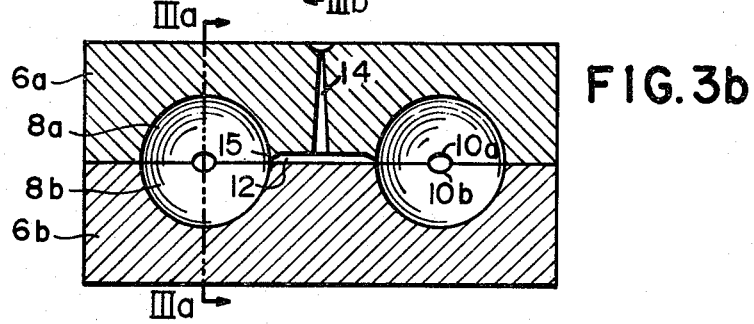
Figure 3C:
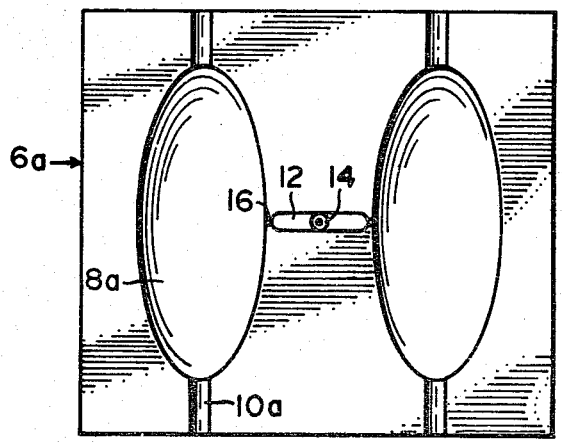

FIGS. 3-a and 3-b are longitudinal and cross sectional views, respectively, of a pair of metal molds for forming two floats by injection molding; FIG. 3-a being a longitudinal sectional view of the pair of metal molds cut along the line III-a and FIG. 3-b being a cross sectional view of the pair of metal molds cut along the line III-b.

FIG. 3-c is a plane view showing the bottom of the upper half metal mold of FIG. 3-a or 3-b.

FIG. 4 is a cross sectional view showing a rope used as leader.

FIG. 5 is a schematic front view showing an apparatus for continuously producing the cork line of this invention.

FIG. 6 is a plane view showing a holding device for a leader.

Figure 7A:
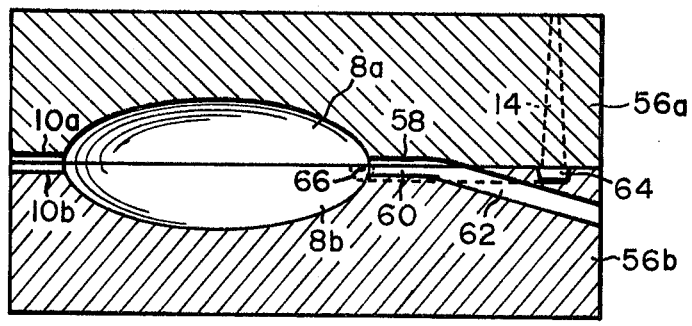
Figure 7B:
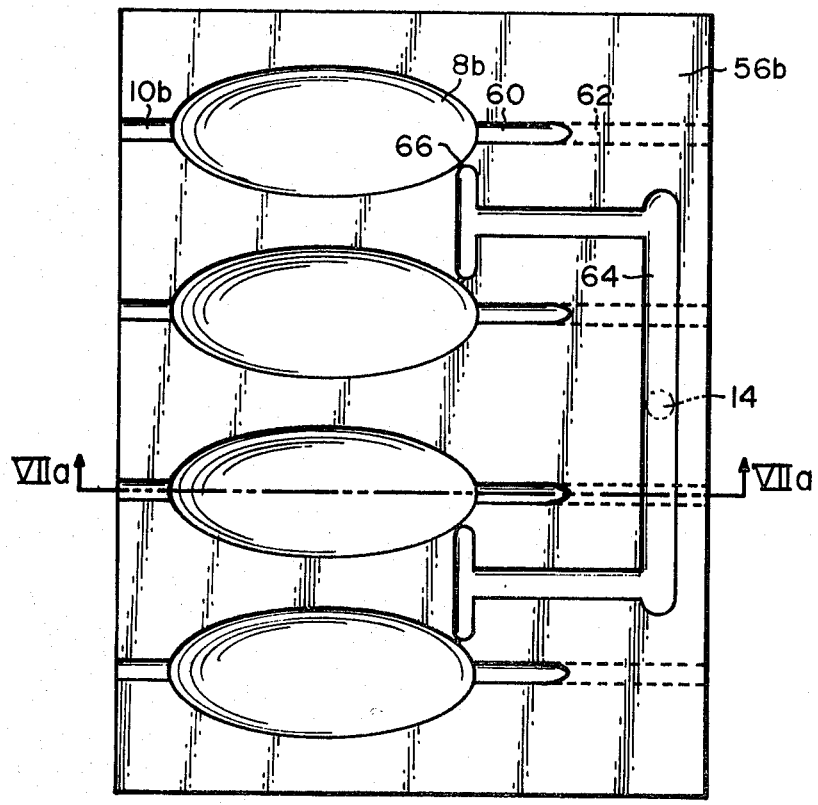

FIG. 7 shows a pair of metal molds capable of forming multiple floats in every molding cycle; FIG. 7-a being a longitudinal sectional view of the pair of metal molds cut along the line VII-a and FIG. 7-b being a plane view showing the lower half metal mold.

FIG. 8 is a schematic plane view showing one example of the apparatus for practicing this invention.

Figure 9:
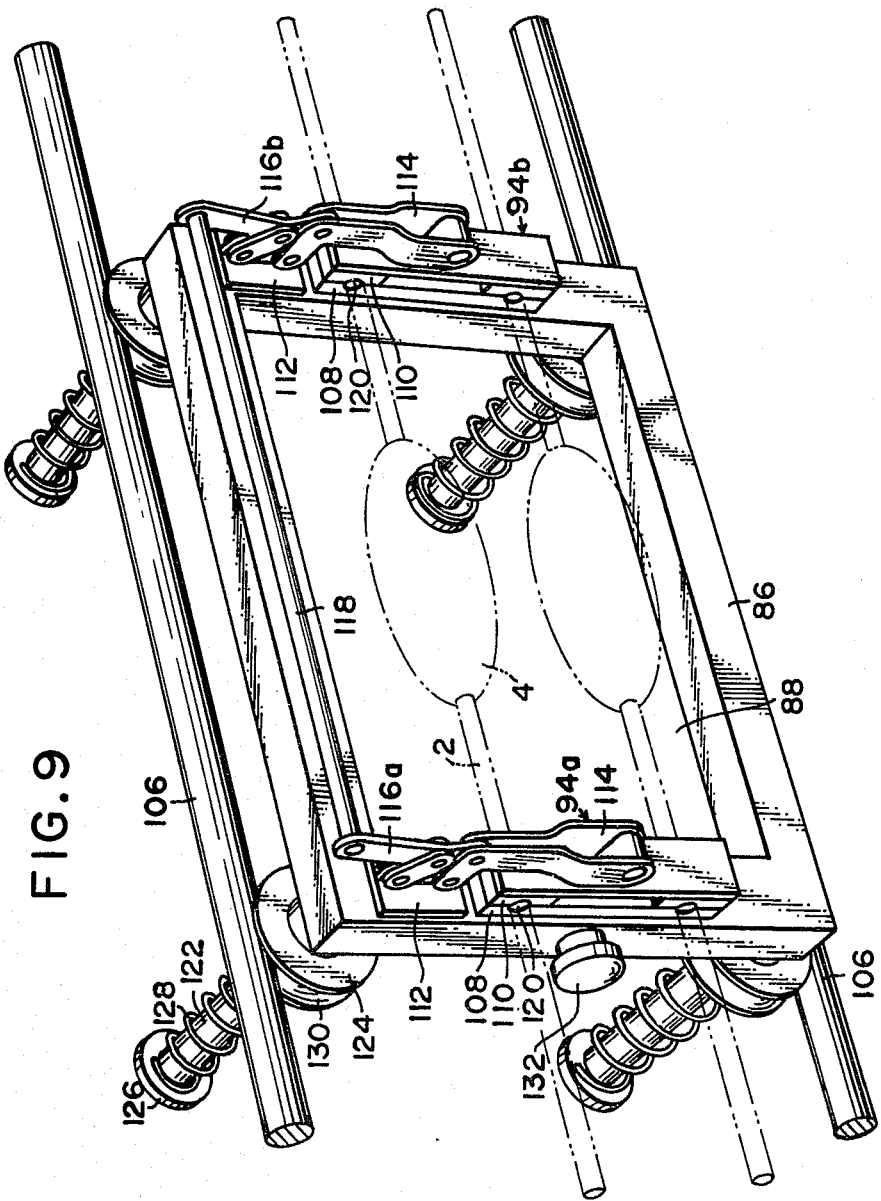

FIG. 9 is a perspective view showing one example of the frame placed on rails so as to slide freely.

FIG. 10 is a front view showing a part of the apparatus of FIG. 8 from the arrow B to the arrow D.

FIG. 11-a is a side view showing the apparatus of FIG. 10 in the position B, where a leader is free from holding.

FIG. 11-b is a side view showing the apparatus of FIG. 10 in the position B, where a leader is held.

Figure 12A:
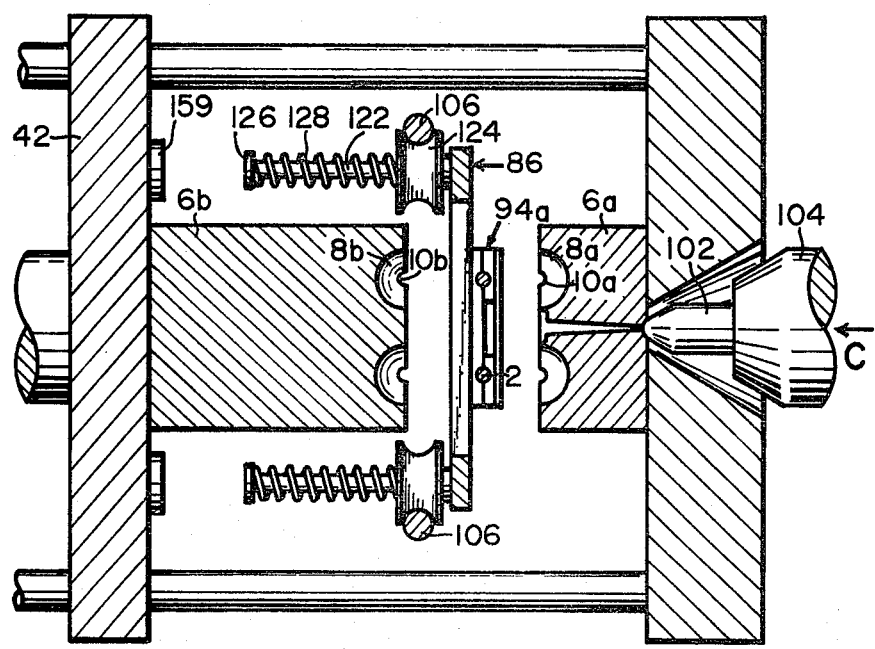
Figure 12B:
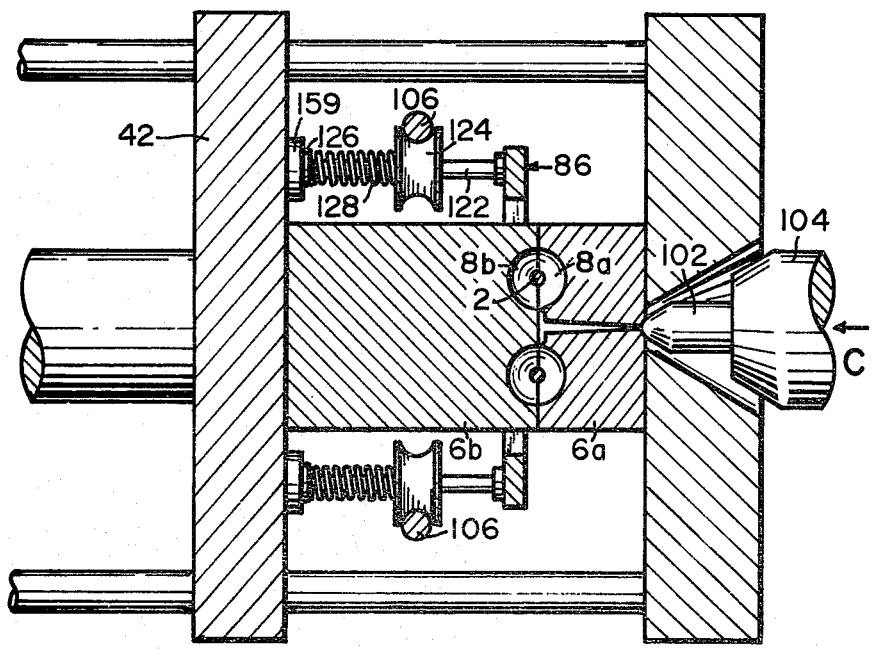

FIG. 12-a is a cross sectional view showing the apparatus of FIG. 10 cut along line indicated by the arrow C, where a leader is held in the state just before injection molding.

FIG. 12-b is a cross sectional view showing the apparatus of FIG. 10 cut along the line indicated by the arrow C, where a leader is being subjected to injection molding.

Figure 13:
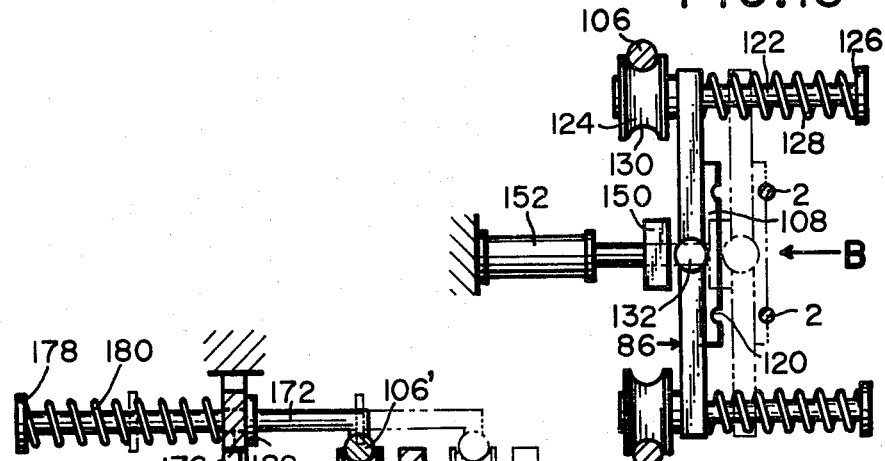

FIG. 13 is a side view showing another example of the frame.

Figure 14A:
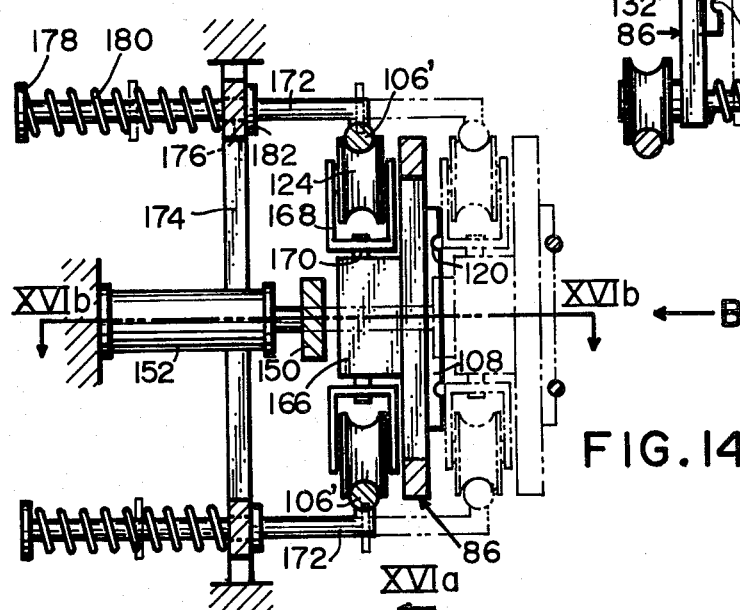
Figure 14B:
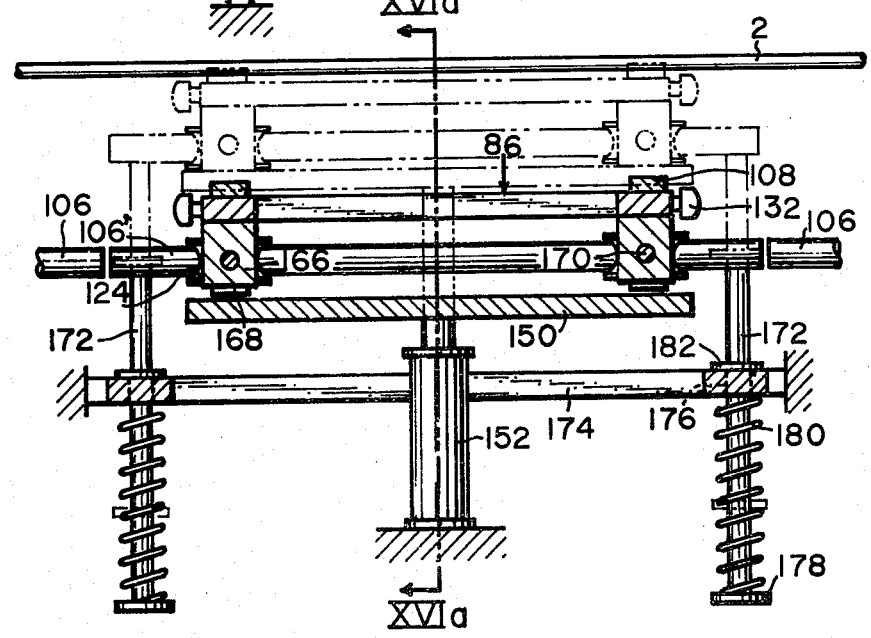

FIG. 14 shows an embodiment for pushing the frame in the front direction; FIG. 14-a being a cross sectional view cut along the line XVI-a and FIG. 14-b being a longitudinal sectional view cut along the line XVI-b.

FIG. 15 is a side view showing further example of the frame.

FIG. 16 is a plane view showing a device controlling the interval of moldings.

FIG. 17 is a longitudinal cross sectional view showing one example of the clamp.

Figure 18A:
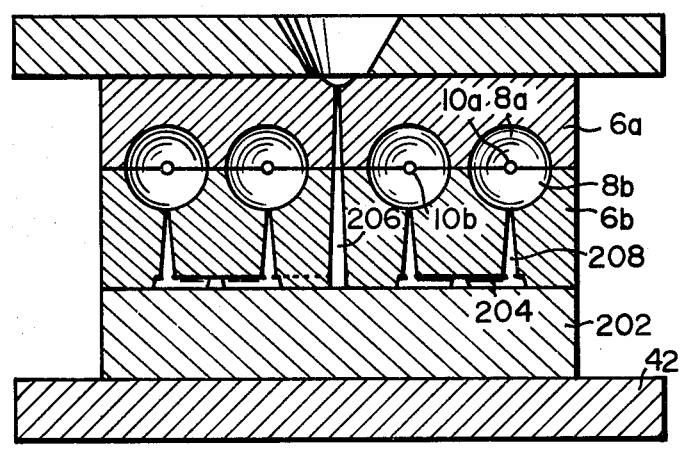
Figure 18B:
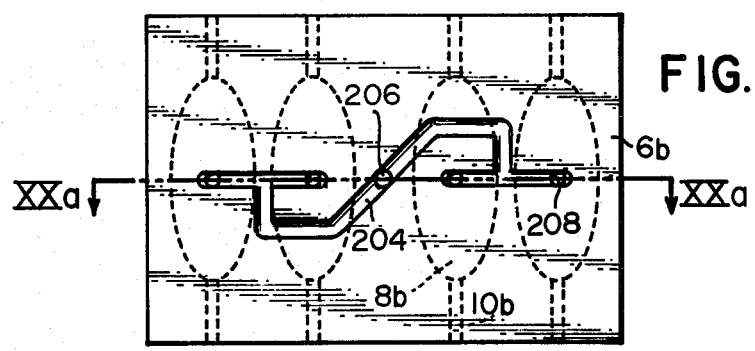

FIG. 18 shows one example of a pair of metal molds capable of forming multiple floats in every molding cycle; FIG. 18-a being a cross sectional view of the pair of metal molds cut along the line XX-a and FIG. 18-b being a plane view of the lower half metal mold.

Figure 19:
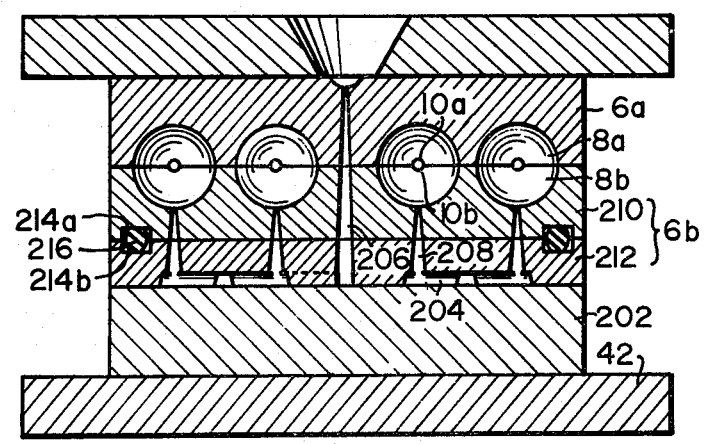

FIG. 19 is a cross sectional view showning another example of a pair of metal molds capable of forming multiple floats in every molding cycle.

FIGS. 20 and 21 are plane views showing various controlling devices which determine the opening order of the metal molds of FIGS. 18 and 19.

FIG. 22 is a plane view showing an example of a device for cooling moldings.

Figure 23A:
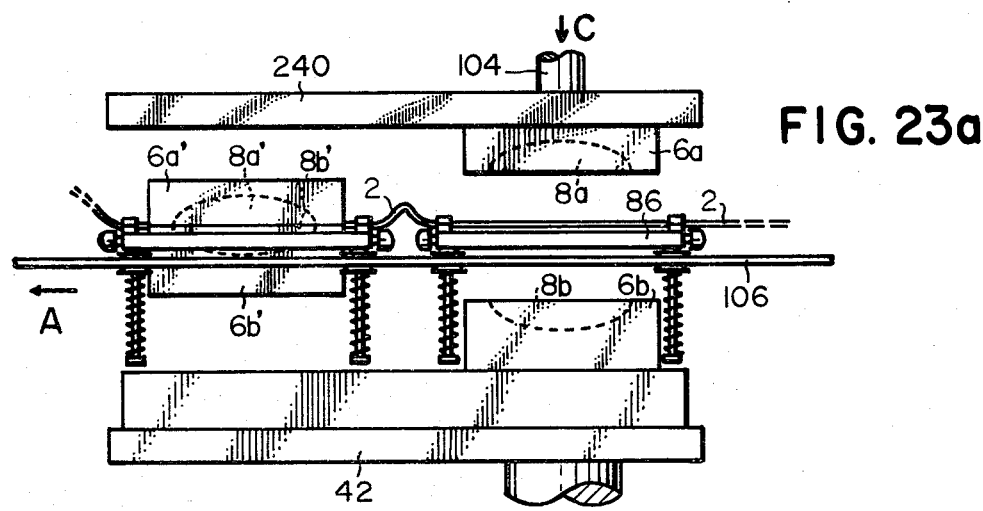
Figure 23B:
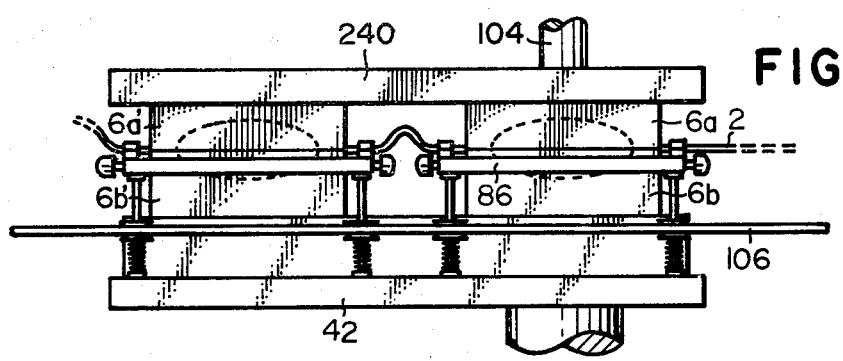
Figure 23C:
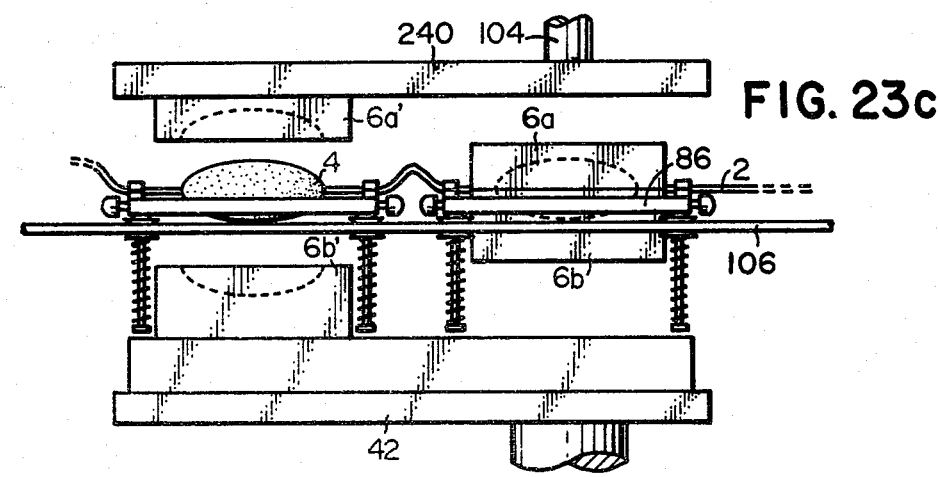

FIG. 23 is a plane view of another example of a device for cooling moldings; FIG. 23-a, FIG. 23-b, and FIG. 23-c showing the process of cooling moldings.

FIG. 24 shows various examples for recycling the frames; FIG. 24-a being an example wherein no gradient is made for rails and FIGS. 24-b to 24-d being examples wherein a proper gradient is made for rails.

Figure 1:
FIG. 1 is a front view showing the cork line of this invention.

In FIG. 1, floats 4 made of a foamed synthetic resin are integrally fixed by injection molding (usually accompanying foaming) to a fibrous leader 2 at definite intervals. The floats 4 are tightly and integrally bonded onto the surface of the leader 2 and so do not detach readily. As the floats 4 are fixed directly onto the surface of the leader 2 when they are formed by injection molding, the cork line thus produced can be used as such for actual use without any further treatment. In the places where injection molding is effected, the floats 4 are exposed and the leader 2 is embedded therein. Thus, the leader is protected and is not damaged during actual use. The cork line of this invention can thus withstand rugged use for a prolonged period of time.

In the cork line of this invention, the leader 2 may be any of the materials utilizable for conventional cork lines. For example, the leader is a rope made by twisting fibers or a braid made by combining fibrous threads. Prior to use, such leader may be reinforced by a treatment with a resin. A material which can be molded at the lowest possible temperature should be selected for the production of the floats. This is due to the reason that as a molten synthetic resin comes into direct contact with a leader in the course of injection molding, the heat of the molten synthetic resin should desirably be low enough to prevent the leader from deterioration resulting from the heat of the molten resin. Thus, the use of a material moldable at a relatively low temperature, such as polyethylene, is preferred. If necessary, polyethylene may be incorporated with one or more of other appropriate synthetic resins. In the case of using polyethylene alone, a gas evolved by foaming tends to escape because of a low melt viscosity of polyethylene. Accordingly, it is difficult to obtain floats having a low specific gravity in the case of using polyethylene alone. In such case, floats having a relatively low specific gravity can be obtained by using a mixture of a high or medium density polyethylene and 3-20% ethylene-vinyl acetate copolymer to enhance the melt viscosity of the molten polymer mixture.

The process and apparatus for producing the cork line of the present invention will now be explained in more detail referring to the relevant drawings.

Figure 2:
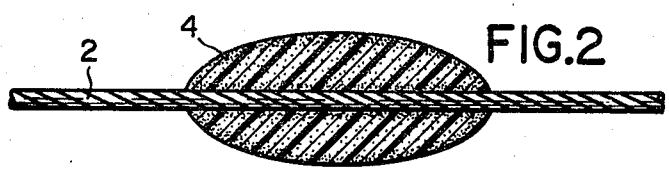
FIG. 2 is an enlarged front view of the cork line of FIG. 1 showing the interior of a float fixed to a leader (rope, in this case).

In FIG. 2 where the interior of the float is shown, the float 4 is perferably a foamed polyethylene which may be tinted with a proper color. The interior surface of the float is tightly and integrally bonded to the exterior surface of a rope 2 as leader. The rope 2 may also be tinted with a proper color according to the intended purpose. The float 4 is smooth in appearance and devoid of voids and any other imperfections even at the edges thereof in contact with the exposed rope.

In FIGS. 3-a and 3-b is shown a pair of metal molds for producing the cork line of this invention. The pair of metal molds consists of the upper metal mold 6a and the lower metal mold 6b. When the two metal molds come into contact with each other, there are formed an entire cavity 8a+8b, which is almost as same in size as the float 4, and furrows 10a and 10b passing through the entire cavity. In FIG. 3-c showing the junctional bottom surface of the metal mold 6a, a runner furrow 12 and a sprue hold 14 are formed rectangularly in the center of the mold 6a. The metal molds per se are made of any of the metals and alloys conventionally employed as molds or dies, such as copper, aluminum, brass, etc.

In the production of the cork line, the metal molds are first
closed holding the leader 2 in a space between the furrows 10a and 10b on the junctional surfaces of the metal molds. Next, a molten synthetic resin mixed with a foaming agent is injected from an injection molding machine (not shown) through the sprue hold 14. The molten resin mixture injected through the sprue hole 14 and the runner 12 to gates 15 is charged into the entire cavity 8a+8b where the resin mixture is foamed and shaped into a float integrally bonded to the leader 2. At this stage, supply of the resin is stopped and the molded float is released from the metal molds for cooling. As the leader 2 passes through the entire cavity during this operation, the molded float 4 is fixed integrally to the leader 2 running therethrough in embedded state. The hold formed by the furrows 10a and 10b is preferably a slightly compressed ellipse in section, as shown in FIG. 3-b. The area of the ellipse should be equal to or slightly larger than that of the leader 2 in cross section and the minor axis of the ellipse should be 15-40% smaller than the diameter of the leader. The diameter of the leader referred to herein means that of a circle circumscribing the outermost part of each strand. For example, in a rope consisting of three strands, the diameter is expressed as d in FIG. 4. Also, the area of the leader in cross section is a total of the sectional areas of the strands constituting the leader. For example, the area of the leader is defined as the total area of the hatched parts in FIG. 4. Consequently, the area in cross section is slightly smaller than that of a circle with a diameter d. When the metal molds 6a and 6b hold the leader 2, they compress the diameter of the leader 2 in only one direction without compressing its cross-sectional area whereby the leader 2 is held firmly in position by furrows 10a and 10b. The leader 2 may contract inside the entire cavity because it comes into contact with the hot molten synthetic resin as has been stated previously, but such contraction is prevented as the leader 2 is firmly held in position. As the cross-sectional area of the leader 2 is not compressed, the fibers of the leader are not damaged by the junctional surfaces of the metal molds when the molds are closed.

When the float is molded inside the entire cavity and cooled, the leader 2 and the float 4 fixed integrally thereto by molding are taken out by opening the metal molds 6a and 6b. During this operation, the interior of the float need not be completely cooled. As far as the cooled outer periphery of the float can withstand the contracting force of the leader by heat and can prevent deformation of the float, the degree of cooling of the float is believed to be sufficient.

In FIG. 5, the right end part 16 is a supporting frame on which one end of a frame 18 of a pulling device 17 is held by a pin 20 so that the device may freely swing. To the other end of the frame 18 is fixed a supporting leg 22 which supports the frame 18. Underneath the frame 18, there are provided a rail 24 parallel to the frame and an air or oil cylinder 26 als parallel to the frame. At the tip of the air or oil cylinder there is fixed a sliding part 28 supported by the above mentioned rail 24 so that the part 28 may move freely thereon. To the sliding part 28 in turn is fixed a holding device 30. In FIG. 6 showing the holding device 30, an air or oil cylinder is fixed to the sliding part 28 and holding fingers 36 are connected to the sliding part through a link mechanism 34. To the sliding part 28 is also fixed a holding plate 38 which, together with the above mentioned holding fingers 36, holds the leader 2 in position. The apparatus is installed so that the tips of the holding plate 38 and the holding fingers 36 of the holding device 30 face the meta molds. In FIG. 5, an operating board 40 is placed so that it may touch a lifting board 44 fixed to a movable table 42 of an injection molding machine (the main body not shown).

A supporting leg 46 on the opposite side of the metal mold from the holding device 30 can be moved up and down by the action of an operating board 48 fixed to the leg 46 and of a lifting board 50 fixed to the movable table 42. On the top of the supporting leg 46, there is fixed a guide ring 52.

In the apparatus of FIG. 5, the leader 2 wound up around the bobbin 54 is pulled out through the guide ring 52 and between the open metal molds 6a and 6b and is held by the holding device 30. When the air or oil cylinder 26 is operated in this state, the movable part 28 recedes toward right in the figure whereby the holding device 30 pulls the leader 2 to draw out the molded float 4 from the opened metal molds 6a and 6b. At the same time, the leader 2 is pulled out from the bobbin 54 and a new portion of the leader is stretched between the metal molds 6a and 6b. When the movable table 42 is elevated in the next step, the furrow 10b of the movable mold 6b comes into contact with the stretched leader 2. By further elevating the movable table, the lifting boards 44 and 50 push up the operating boards 40 and 48 whereby the supporting legs 22 and 46 are lifted. At this moment, the pulling device 17 swings clockwise (dextrorotation) around the pin 20. Thus, the leader 2 is stretched between the guide ring 52 and the holding device 30 and is pushed up while touching the furrow 10b of the movable mold 6b. When the metal molds 6a and 6b are closed, the leader 2 is held between the furrows 10a and 10b. Subsequently, a molten synthetic resin is injected from the cylinder 55 of the injection molding machine into the entire cavity (total of half cavities 8a and 8b), foamed and cooled to form a float. During this operation, the air or oil cylinder 32 of the holding device 30 shown in FIG. 6 rotates the holding fingers 36 thereby releasing the leader 2. The air or oil cylinder 26 of the pulling device 17 then pushes the movable part 28 and the holding device 30 fixed thereto toward left in the figure. As the tip of the pulling device 17 is lifted, the holding device 30 is located on the extension plane of the junctional surface of the metal molds 6 whereby the leader 2 extending from the edge of the metal molds 6 is located between the holding fingers 36 and the holding plate 38 shown in FIG. 6. Thus, by operating the air or oil cylinder 32 of the holding device 30, the holding fingers 36 are moved and the leader 2 is held between the holding fingers 36 and the holding plate 38.

After the formation of the float 4, the metal molds 6 are opened and the movable table 42 is moved down whereby the pulling device 17 rotates counterclockwise because of its own weight and the supporting leg 46 is also moved down because of its own weight.

Accordingly, the molded float 4 is detached from the upper metal mold 6a and moved down with the lower metal mold 6b. When the lower ends of the supporting legs 22 and 46 touch the floor, the float 4 is supported by the leader 2 and can no longer be moved down, while the metal mold 6b alone is moved down. Therefore, the float 4 is then removed from the lower metal mold 6b and is suspended between the two metal molds 6a and 6b as shown in FIG. 5. By repeating this process, floats can be molded continuously, thus enabling the continuous production of the cork line in a commercial scale.

With metal molds as shown in FIG. 3, it is difficult to produce at least three cork lines at a time. Since the furrows 10a and 10b through which the leader 2 passes are formed on the junctional surfaces of the metal molds, it is impossible to form further runner furrow or furrows without crossing these furrows 10a and 10b.

In FIG. 7 are shown metal molds with which it is possible to produce four cork lines simultaneously. Metal molds 56a and 56b have an entire cavity (a total of the half cavities 8a and 8b) on the junctional surfaces thereof. Furrows 58 formed on the upper metal mold 56a are terminated halfway on the junctional surface. From the terminal end of the corresponding furrows 60 on the other metal mold 56b, penetrating holes 62 to the side of the metal mold 56b are formed. On the part of the junctional surface corresponding to the penetrating holes 62 there is provided a runner furrow 64. This runner furrow 64 is formed so that it crosses the penetrating holes three-dimensionally, and branched at its both ends to the half cavities 8b through gates 66. In case these metal molds are used, the leader 2 is first passed through the penetrating hole 62 and is fitted into the furrows 10b and 60 before closing the metal molds 56a and 56b. When a molten synthetic resin is injected into the entire cavity 8a+8b from the sprue hole 14 through the runner furrow 64 and the gates 66, four floats are concurrently formed. The metal molds 56a and 56b are then opened to take out the floats 4. When the floats are drawn to the left together with the leader 2, the leader 2 is pulled out through the penetrating hole 62 and a new portion of the leader 2 is supplied on the junctional surface of the metal mold 56b. By repeating this process, the cork lines can be manufactured continuously. According to this method, not only four cork lines but also six, eight or more cork lines can be manufactured simultaneously. In the figure, the runner furrow 64 is formed on the metal mold 56b, but it is a matter of course that it may be formed in the corresponding position of the metal mold 56a.

The above described process and apparatus are particularly suitable if the size of the floats is small and are indeed effective in manufacturing a large amount of cork lines with small facilities. However, this method and apparatus may also be used for the production of cork lines having large size floats, if it is permitted that the time for cooling the molded floats required a relatively longer period of time. For example, the period of time from completion of injection molding till opening of the metal molds is about 15 seconds if a float of about 2 cm in diameter and about 6 cm in length is used. Whereas, the period of time required for cooling floats of about 3 cm in diameter and about 7 cm in length is about 40 seconds. This is due to the reason that the cooling of the floats requires a very long period of time since the floats just after molding are hot foamed articles. If the floats are taken out from the molds without sufficient cooling, heat of the interior which is kept still hot is gradually transmitted to the outer surface, thus resulting in softening and deforming of the surface by the foaming pressure from the interior. On the other hand, the leader 2 embedded in the floats tends to contract by heat, thus causing both ends of the flosts indent. This not only reduces the commercial value of the product but also causes fluctuation in length of the cork line. When the floats are big in size, the problem becomes particularly serious. To overcome such problem, the time required for forming the floats becomes extremely long, thus making it disadvantageous to perform continuous production of cork lines in large quantities.

The following improved process and apparatus have been developed to overcome such disadvantages. According to this improved process, floats are fixed by molding to the leader 2 previously fixed to a frame in a stretched state. Then, the resultant floats are taken out from the metal molds in such state that the surface of the floats is cooled but the interior thereof is still hot and are then cooled continuously in a separate cooling zone. As the leader is firmly held by the frame, no contraction takes place in the leader. Accordingly, no indentation is formed on either end of the float.

In FIG. 8-12 is shown an example of the above improved process and the apparatus of this invention. In FIG. 8, a pair of rails 106 is arranged so as to form a pair of endless loops as a whole. A large number of frames 86 are disposed along the pair of loop rails so that each frame is supported by the rails and can slide freely thereon. In FIG. 9, a frame 86 is supported by the rails 106. The frame 86 is a rectangular plate with a rectangular window 88 in the center thereof. Onto the surface of both front and rear ends of the frame 86 are mounted clamps 94a and 94b to secure the leader 2. The clamps 94 in this example comprise a basal plate 108 and a pressing plate 110 to hold the leader 2 between them. The basal plate 108 is fixed to the surface of the rim of the frame 86 while the pressing plate 110 is connected by an axle to a bracket 114 which is connected by another axle to a mounting board 112 fixed to the rim of the frame. An arm 116 is provided to operate the bracket 114. By operating the arm 116, the pressing plate 110 is rotated to open and close the clamp 94. The two arms 116a and 116b are connected with an operating bar 118 so that the two clamps 94a and 94b can be operated simultaneously by manipulating the operating bar 118. On the junctional surfaces of the basal plate 108 and the pressing plate 110, there are formed furrows 120 to hold the leader 2 in a definite position.

On each corner of the backside of the frame 86 is plated a shaft 122 around which is placed a wheel 124 so that the frame is freely rotatable and slidable on the rail. Between a flange 126 at the tip of the shaft 122 and the wheel 124 is inserted a spiral spring 128 which pushed the wheel toward the backside of the frame 86. Along the circumference of the wheels 124 there are formed furrows 130 with which fits in a pair of cylindrical rails 106 placed parallelly to the backside of the frame 86 thereby supporting the frame 86.

Bumper devices 132 preferably made of a flexible material such as rubber are mounted to both front and rear ends of the frame 86, which are brought preferentially into contact with each other to absorb shock when the frames 86 come into collision with each other.

In FIG. 8, A shows the direction of movement of the frame 86, B a position where the leader 2 is fixed to the frame 86, C a position where a float 4 is fixed by molding around the leader 2 stretched upon the frame 86, D a position where the float 4 fixed by molding around the leader 2 is cooled and E a position where the resulting cork line is taken out from the frame 86.

In FIG. 10, the frame 86 moves from left to right along the rails 106 and once stops in the position B. A stopper 134 is connected by an axle under the rails so that it is rotatable around the axle 138 by the action of an air or oil cylinder 136. A relatively large air (or oil) cylinder 140 is provided along the rail 106. The frame 86 is pushed toward right along the rails from left by the action of the air (or oil) cylinder 140 and is stopped in the position B by the action of the stopper 134. The leader 2 are drawn out from a bobbin 54, passed through a guide ring 141, a weight 142 for controlling tension and a frictional guide 144 and is stretched between the frictional guide 144 and the frame 86 in the position C somewhat away from the surface of the frame 86 in the position B as shown in FIG. 11-a. The frictional guide 144 comprises a supporting pole 146 and a pressing plate 148 between which the leader 2 is held. When the leader 2 is pulled, it can pass through the frictional guide under friction. In the position B, there are placed an air (or oil) cylinder 152 with a pushing plate 150 at the tip thereof behind the frame and an air (or oil) cylinder 154 for closing the clamp above and in front of the frame, as shown in FIG. 11. To fix the leader 2 to the frame 86, the frame 86 is pushed forwards by pushing out the pushing plate 150 by the action of the air (or oil) cylinder 152. As the shaft 122 and the wheel 124 are connected so as to be freely slidable, the frame 86 alone is pushed forwards while compressing the spiral springs 128 and allowing the wheels 124 to fit in with the rails 106. Accordingly, the basal plates 108 of the clamps 94 come into contact with the leader 2, which then fits in with the furrows 120. When the air (or oil) cylinder 154 is operated in this state, the operating board 156 at the tip thereof pushes the operating bar 118 of the clamps 94 whereby the clamps 94 are closed to fix the leader 2 to the frame 86 as shown in FIG. 11(b). In this case, shafts planted to the backside of the frame 86 are connected with a spiral spring to a supporting board fixed to the chains 68 so that they are freely slidable. In this manner, only the frame 86 can be moved back and forth perpendicularly to the rails. Needless to say, the movable sprocket 74 is not necessary in this case.

Turning now to FIG. 10, the frame 86 in the position B is held in a fixed position as has been described and the frame in the position C is also held in a fixed position as will be described hereinafter. Therefore, the length of the leader 2 between frames 86 is always maintained constant, and hence, the interval between the floats fixed to the leader is also maintained constant. Consequently, no attention has to be paid to the interval between floats in the subsequent operations. By moving the position of the stopper 134 and the air (or oil) cylinder 154 for closing the clamps forward or backward, the interval between floats 4 on the leader 2 can be changed easily. In the next step, the frame 4 in the position B is moved forward (toward right in FIG. 10) to the position C. After the air (or oil) cylinder 136 rotates the stopper 134 clockwise, the frame-driving air (or oil) cylinder 158 pushed the frame in the position B toward right. Thus, the frame 86 in the position C by the bumper devices 132. In this manner, the frame 86 further advances toward right while pushing the preceding frames 86 by the bumper device. When the frame 86 first pushed by the action of the air (or oil) cylinder comes to the position C, the air (or oil) cylinder stops. As the leader 2 is fixed to the frame 86, the leader 2 is drawn out during this process in accordance with the movement of the frame 86. However, the leader is not drawn out excessively because it is pressed by the frictional guide 144. When the movement of the air (or oil) cylinder 158 stops, the leader 2 is no longer drawn out and prevents the movement of the frame 86 beyond the prescribed position by pulling it backward. Therefore, the frame 86 in the position C is always kept in a fixed position, without being influenced by such factors as inertia. The frame-moving air (or oil) cylinder 158 does not necessarily have to move the frame in the position B to the position C. By moving forwardly any one of the frames 86 mounted to the rails 106, all the other frames in front are moved forwardly by being pushed while the other frames in rear are also moved forwardly by being pulled by the leader 2. Furthermore, the position B and the position C need not be adjacent to each other. Depending on the convenience of design, one or more frames may be inserted between these positions. The position B and the position C may overlap. In this case, the frame 86 is first sent to the position C and the leader 2 extending out of the metal molds may be fixed to the frame 86, while fixing the float 4 around the leader 2 by molding. In any case, however, it is best to move forwardly the frame 86 which should come to the position C by the action of the frame-moving air (or oil) cylinder 158 so as to precisely determine the position of the frame 86 in the position C. Otherwise, a device to determine the position of the frame 86 in the position C should be provided separately.

In FIG. 12 illustrating a process for fixing the float 4 by molding to the leader 2 stretched upon the frame 86 in the position C, FIG. 11-a shows the metal molds in open state and FIG. 11-b shows those of closed state. As the movable table 42 moves forward through the window 88 of the frame 86, the movable metal mold 6b touches the leader 2 which will be stretched across the cavity 8b and fit into the furrows 10b at both ends of the cavity. At the same time, the protuberances 159 on the movable table 42 touch the flanges 126 at the tip of shaft 122 of the frame 86 and push the frame 86 along with the leader 2 forward (upward in the figure), while compressing the spiral springs 128, until the movable metal mold 6b comes into contact with the stationary metal mold 6a whereby the metal molds are closed. By pushing out the frame 86 along with the leader 2, unnecessary force which may otherwise be exerted upon the leader 2 is avoided. Next, a molten synthetic resin is injected from the nozzle 102 at the tip of the cylinder 104 into the entire cavity (total of the half-cavities 8a and 8b). The amount of the resin injected is appropriately controlled according to the nature and purpose of the produced float. After the surface of the float 4 has been cooled, the movable table 42 is moved backward (downward in the figure) to open the metal molds. Simultaneously, the frame 86 also recedes by the resilience of the spiral springs 128. After the frame 86 has touched the wheels 124, only the movable metal mold 6b recedes. Therefore, the float 4 is automatically taken out from the metal molds and sprue etc. are also removed automatically.

The frame 86 pushed by another frame 86 in the position B moves forwardly which pushed the frames 86 in front thereof. In FIG. 8, the floats 4 pass through a cooling chamber in the position D designated as 160 where they are entirely cooled. Cold blast of air is sent into the cooling chamber 160 through a ventilator 162 to thoroughly cool the interior of the float 4. Although such cooling is sufficiently attained by merely leaving the float-carrying leader stretched upon the frame 86 without providing such cooling chamber, it takes a very long period of time to cool the hot foamed interior of the float completely. Furthermore, the decomposition reaction of the foaming agent still continues inside the float while the float is being cooled. Thus, it is preferable to prevent any deformation of the float resulting from the internal pressure by compulsorily cooling the surface of the float. After the frames 86 have passed through the position D in order and the floats 4 have been cooled thoroughly, the clamps 94 are opened in the position E to release the resultant cork line from the frame. The clamps 94 are opened by pushing the operating bat 118 forward with an air (or oil) cylinder 164 provided above the frame 86. The frame 86 from which the leader 2 have been taken out by opening the clamps 94 is again moved to the position B to fix a new portion of the leader 2 and subjected to the same process again.

The apparatus of this invention is not limited to the above mentioned structures, but can be modified freely at need.

In FIG. 13 is shown an example of the modified frame 86 which slides along the rails 106 wherein the wheels 124 are connected by axles to the shafts 123 so as to be freely rotatable, the shafts 123 are passed through holes at four corners of the frame 86 so as to be freely slidable and the spiral springs 128 are inserted between the flanges 126 fixed to the tips of the shafts 123 and the surface of the frame 86. According to this example in which the shafts 122 slide through the body of the frame 86, the function and the effect of the movement are same as in the example shown in FIG. 9.

In FIG. 14 is shown another modified example wherein the blocks 166 are fixed to the backside of the front and the rear rim of the frame 86, above and below which are connected channel-like bearing fames 168 with pins 170 at the base so as to be freely rotatable and wheel 124 are connected by axles to the bearing frames 168. The portions 106' of the rails 106 in the positions B and C are cut away from the rest of the rails, the length of which is slightly longer than the distance between the wheels 124. On both ends of the cut portions of the rails 106' are fixed sliding shafts 172 which extend parallelly in the backward direction and are passed freely slidably through holes 176 in the supporting frame 174 fixed behind the rails 106. Between each flange 178 at the tips of the sliding shaft 172 and the supporting frame 174 is inserted a spiral spring 180. The cut portions of the rails 106' are always pulled backward by the resilience of the spiral springs 180, but are maintained in a position where the cut portions of the rails 106' will form continuous rails with the rest by stoppers 182 mounted around the middle of the sliding shafts 172 to come into contact with the supporting frame 174. Under ordinary conditions, therefore, the frame 86 can pass through the positions B and C, moving forward along the rails. When the leader 2 is fixed to the frame 86 in the position B, for example, the frame 86 is pushed forward by a pushing plate 150 fixed at the tip of an air (or oil) cylinder 152. In this moment, the cut portions of the rails 106' are pushed forward along with the frames 86 in the state engaged with the wheels 124, while compressing the spiral springs 180. Thus, the frame 86 comes into contact with the leaders 2 stretched in front thereof, which can then be fixed to the frame 86 by closing the clamps 94 while the leaders 2 are maintained in this state. In the position C, too, the protuberances 159 on the movable table 42 push the flanges 178 of the shafts 172 to move the frame 86 forward along with the cut portions of the rails 106'. Thus, the leader 2 can be held between the metal molds without exerting unnecessary force to the leader 2.

In this example, some devices must be provided in the cut portions of the rails 106' in the positions B and C to attain the desired operation there. On the other hand, the structure of each frame becomes simpler, the radius of curvature of the rails 106 can be made smaller than in the previously mentioned cases for the reason that the direction of the wheels 124 can rotate relative to the frame 86. In this example, therefore, the size of the apparatus as a whole can be made more compact.

It is also possible to support the frames 86 shown in FIG. 14 on continuous rails 106. In this case, however, it is impossible to push the frame 86 forward when the leaders 2 are to be fixed to the frame 86 in the position B. Thus, some additional means for drawing the leaders 2 closer to the frame 86 must be provided in this case. Also in the position C, both metal molds 6a and 6b must be movable ones which can move toward the frame 86 so that they will be closed in the position where the leaders 2 are fixed to the frame 86. Therefore, the structures of the rails 106 and the frames 86 become certainly simpler, but the structure of the injection molding machine will become much more complex. It is possible to fix the leaders 2 to the frame 86 by drawing the leaders 2 closer to the frame 86 in the position B and to form the cut portions of the rails 106' in the position C, as shown in FIG. 14, for pushing the leaders 2 forward together with the frame 86 and the cut portions of the rails 106'.

In FIG. 15 is shown still another modified example wherein a wheel 124 is freely rotatably connected by an axle to an arm 184 of an inverted L-shape which is fixed to the upper end of the frame 86 and the wheel 124 is placed on a single rail 106. The frame 86 can move and swing freely hanging down from the rail 106 by the wheel 124 and is inclined backward because of the position of the center of gravity as shown in FIG. 15. If the frame swings considerably on moving along the rail 106, an auxiliary wheel 186 may be provided so that it may rotate along an auxiliary rail 188. In this example wherein the frame can swing freely, the frame 86 can be pushed forward by swinging it counterclockwise around the rail 106 as rotation axis when the leaders 2 are fixed to the frame 86 in the position B and when the floats 4 are fixed by molding to the leaders 2 in the position C.

In FIG. 16 is shown an example of the apparatus for maintaining the interval between the floats 4 at a desired length. If the interval between the floats 4 is to be controlled by the distance between the frames 86 held in given positions as shown in FIG. 10, it will be difficult to make the interval between the floats 4 longer. In this example, therefore, a bender 192 fixed to the tip of an air (or oil) cylinder 190 is inserted downwardly between the frame in the position B and that in the position C to create a surplus 2' of a given length in the leader 2 between the frames before closing the cramps 94 in the position B. After this operation, the clamps 94 of the frame 86 are closed in the position B. In this manner, the interval between the floats 4 can be made greater than that between the frames 86 held in given positions. In this case, too, the interval between the frames in the positions B and C is desirably controlled.

In FIG. 17 is shown an example of the clamp 94 on the frame 86. A screw bolt 194 is passed through a hollow rim of the frame 86 so as to be freely rotatable. To the screw bolt 194 are fitted holding pieces which protrude beyond the surface of the frame 86. When the screw bolt 194 is rotated by turning the bolthead 198, the holding pieces 196 slide on the surface of the frame 86 and secure the leaders 2 together with the fixed holding pieces 200 on the surface of the frame 86. It is also possible to form both left-handed screw and right-handed screw on the screwbolt 194 to which are fitted the corresponding holding pieces 196 so that these holding pieces 196 may mutually come closer and go away relative to the fixed holding pieces 200 on turning the screw bolt.

In FIG. 18 showing an example of a pair of metal molds capable of producing at least three cork lines at a time, the metal molds consist of the three parts; one is a stationary metal mold 6a, another is a movable metal mold 6b and the other is a runner metal mold 202. On the junctional surfaces of the stationary metal mold 6a and the movable metal mold 6b are formed half-cavities 8a and 8b and furrows 10a and 10b. On the junctional surfaces of the movable metal mold 6b and the runner mold 202 is formed a runner furrow 204, the center of which is drilled to form a sprue hole 206 which passes through the movable mold 6b and the stationary mold 6a. On the surface of the movable mold is further formed a gate hole 208 leading from the end of the runner furrow 204 through the movable mold 6b to the half-cavity 8b. When a molten syntheic resin containing a foaming agent is injected from the sprue hole 206 of the above molds, the molten resin from the sprue hole 206 passes through the runner furrow 204 and the gate hole 208 into the entire cavity 8 (8a+8b). When the runner mold 202 is moved backward (downward in the figure) after the float 4 has been molded inside the cavity 8, the synthetic resin within the sprue hole 206 and the gate hole 208 is drawn out while disconnecting the tip of the sprue and the gate. Then, the movable mold 6b recedes whereby the formed float 4 is taken out together with the leader 2. Since the molten synthetic resin is distributed by the runner furrow 204 provided between the movable mold 6b and the runnr mold 202 according to this method, the runner furrow 204 does not cross with the furrows 10a and 10b for accommodating the leader 2, and accordingly, at least three cork lines can be produced at the same time. The runner mold 202 may be provided on the side of the stationary mold 6a but, in this case, the stationary mold 6a must be moved in removing the runner and the sprue. Thus, this modification makes a defect such that the frame 86 must move for a greater distance. Therefore, it is preferable to provide the runner mold 202 on the surface of the movable mold 6a and to let the sprue hole 206 pass through the stationary mold 6a and the movable mold 6a, as shown in FIG. 18.

In FIG. 19 showing a modification of the metal mold of FIG. 18, the movable mold 6b is divided into a cavity plate 210 and a separating plate 212. On the junctional surfaces of these plates are formed blind holes 214a and 214b into which an elastic material 216 is inserted. When the movable table 42 is moved backward in the metal molds of this type, the cavity plate 210 and the separating plate 212 are pushed open first by the resilience of the elastic material 216, disconnecting the tip of the sprue and the gate. As the runner mold 202 is then moved backward (downward in the figure), the synthetic resin within the sprue and the gate hole is drawn out smoothly. Thus, the gate is disconnected clearly without causing any imperfection on the surface of the resultant float.

In FIGS. 20 showing a controlling device 217 for determining the opening order of the metal molds of FIG. 18, the controlling device 217 comprises a hook 218 at the tip thereof and a tail 224 having a straight rim 220 and a slanted rim 220 relative to the straight rim. The controlling device 217 is connected rotatably to the movable mold 6b by a pin 226 provided near the center of the device. A pin 228 is fixed to the stationary mold 6a and can fit in with the hook 218. A pin 230 is fixed to the runner mold 202 and a spring 232 is provided between the device 217 and the movable mold 6b. FIG. 20-a shows the metal molds in closed state. When the movable table 42 is first moved backward (downward in the figure), the runner mold 202 alone moves backward and the pin 230 slides along the straight rim 220 as shown in FIG. 20-b. After the pin 230 has reached the lower end of the straight rim 220, it then slides along the slanted rim 222 whereby the controlling device 217 rotates clockwise against the resilience of the spring 232, releasing the pin 228 from the hook 218. As the movable table 42 further recedes (goes down in the figure), the movable mold 6b also recedes, leaving the formed float 4 behind the frame 86, as shown in FIG. 20-c.

In FIG. 21 is shown a controlling device used for the metal molds of FIG. 19, wherein an edge 234 parallel to the direction along which the metal molds open is provided behind a hook 218. The controlling device 217 is connected by a pin 226 to the separating plate 212. In front of the pin 226 (above the pin 226 in the figure), there is formed a window into which fits in a pin 238 fixed to the cavity plate 210.

As the movable table 42 recedes (downward in the figure), the cavity plate 210 and the separating plate 212 are first pushed open by the action of the elastic material 216, the pin 228 is fitted to the hook 218 and the pin 238 comes into contact with the front end of the window 236 as shown in FIG. 21-b. As the movable table 42 further recedes, the runner mold 202 also recedes, drawing out the sprue and the runner as shown in FIG. 21-c. Then, the controlling device rotated by the same mechanism as described in the case of FIG. 20 whereby the pin 238 is pulled by the margin of the window 236 and the cavity plate 210 and the separating plate 212 move backward leaving the formed float 4 behind, as shown in FIG. 21-d.

In FIG. 22 and 23 are shown examples of the device for cooling the floats 4 fixed by molding to the leader 2. In FIG. 8, the floats 4 are cooled in the cooling chamber 160. As the floats 4 just after molding are hot foamed articles, however, they are difficult to cool rapidly and sometimes they are deformed or, in the extreme case, broken by the high inner pressure of gas evolved by decomposition of a foaming agent. Although probability of deterioration in quality of the product may be reduced by allowing the hot floats to stand in the metal molds for a prolonged period of time until satisfactory cooling is attained, such cooling treatment makes the molding cycle time longer, resulting in reduction of the production efficiency in the process. The devices shown in FIGS. 22 and 23 are proposed to prevent deformation or rupture of the floats 4 by placing them in metal molds exclusively designed for cooling.

In FIG. 22 is shown a device wherein cooling metal mold 242a and 242b similar to the metal molds 6a and 6b are attached to the stationary table 240 and the movable table 42 of the injection molding machine. After fixing the foats 4 by molding to the leader 2 in the metal molds 6a and 6b in the position C, the frame 86 is moved forward to a given position between the cooling metal molds 242a and 242b. As the metal molds 6a and 6b are closed to fix a new float 4 by molding to the leader 2 stretched upon the following frame 86, the cooling metal molds 242a and 242b are also closed whereby the already molded float 4 is fitted to the cavity (244a and 244b) inside the cooling metal molds. Therefore, the use of the cooling metal molds serves not only to cool the surface of the float 4 externally but also to prevent any deformation of the float because its shape is maintained externally by the molds of the same size. According to this method, therefore, the time required for cooling the floats with the metal molds can be doubled without prolonging the molding cycle. It is also possible to increase the number of the cooling metal molds.

As the cooling metal molds 242a and 242b are not used for molding articles but for simply absorbing heat from the surface of the molded articles, only a little force is required to close the cooling metal molds.

In FIG. 23 is shown another example wherein two sets of metal molds for injection molding are alternately used for both molding and cooling purposes. After the float 4 is fixed by molding to the leader 2 stretched upon the frame 86 using one of the sets of metal molds, the frame 86 is moved forward (toward left in the figure) along with the metal molds in closed state and then another float 4 is fixed by molding to the leader 2 stretched upon the succeeding frame 86 using the other set of the metal molds. In FIG. 23-a, a stationary metal mold 6a and a movable metal mold 6b are mounted to the stationary table 240 and the movable table 42, respectively, in the molding position of the injection molding machine and a frame 86 stops in open state between the metal molds. Then, as shown in FIG. 23-b, the movable table 42 moves forward (upward in the figure) to close the metal molds 6a and 6b and a float 4 is fixed there by molding to the leader 2. When the movable table 42 is then moved backward (downward in the figure), the metal molds 6a and 6b are detached from the stationary table 240 and the movable table 42 and remain still in closed state on the frame 86 as shown in FIG. 23-c. Next, when the frame 86 moveds forward in the direction A in FIG. 8 (toward left in the figure), the metal molds 6a and 6b are also moved forward and occupy the positions designated by 6a' and 6b' in FIG. 23-a. The movable table 42 again moves forward (upward in the figure) and another float 4 is molded to the leader 2 using the other set of the metal molds 6a and 6b as shown in FIG. 23-b. During this molding treatment, the metal molds 6a' and 6b' remain still in closed state and the float 4 is satisfactorily cooled by the metal molds. When the movable table 42 recedes in the next step, as shown in FIG. 23-c, the stationary metal mold 6a' and the movable metal mold 6b' are separated and attached to the stationary table 240 and the movable table 42, respectively. Then, the stationary metal mold 6a' and the movable metal mold 6b' move on the stationary table 240 and the movable table 42 until they occupy the original positions of the metal molds 6a and 6b in FIG. 23-a. Thus, the two sets of metal molds are used alternately according to this method for both injection molding and cooling purposes, and hence, not only is it possible to double the period of time during which the float 4 is retained inside the metal molds for sufficient cooling without prolonging the molding cycle but also it is possible to shorten the molding cycle because the movable table may be moved backward before the surface of the synthetic resin injected into the closed metal mold has been cooled sufficiently and the frame 86 can be moved forward along with the closed metal molds. It is also possible to make the molding cycle much shorter while remarkably extending the cooling time by using many metal molds in turn. This method may be carried out using a rotatory injection molding machine.

By further extending the method depicted in FIGS. 22 and 23, it is possible to fully cool the interior of the float 4 with the metal molds alone thereby making the whole production line more compact and increasing the production rate. According to this system, however, the structure of the injection molding machine will become very complicate. Therefore, it is preferable to use this cooling method in combination with the cooling chamber 160 shown in FIG. 8. When the surface of the molded floats is sufficiently cooled and there is no fear of deformation without the metal molds, the method depicted in FIGS. 22 and 23 should be terminated and floats should be passed through the cooling chamber.

In the example shown in FIG. 10, rails 106 are arranged in a loop in a horizontal plane but the structure is not limited to such a loop. A circular arrangement is convenient for recycling the frames 86 from which the leader 2 has been removed back to the position B, but such arrangement requires a large space to install the apparatus. On the other hand, a linear arrangement requires a special device to return the frame 86 at the terminal end of the line back to the starting point, but is convenient in that no broad space is required even in the event many lines are to be aligned.

In FIGS. 24-a to 24-d are shown several modes of the conveying system for recycling a series of frames. The rails 106 of the apparatus of FIG. 8 may be installed horizontally over its entire length as shown in FIG. 24-a. In case the rails are installed in the form of a loop, the frames 86 from which leader 2 has been removed may be readily returned to the position B by making a minor modification therein. In an example shown in FIG. 24-b, there are provided a slight acclivity 246 in the rails 106 from the halfway of the zone D (for cooling treatment), a position E near the top of the acclivity, a declivity 248 capable of making the frame 86 run down by its own weight to the position B where the leader 2 is stretched on the frame 86. By pushing the frame 86 in the position B to the position C in this device, all the frames ahead thereof (the right-hand frames from the position C in the figure) are pushed forward in order whereby the frame at the top of the acclivity 246, for example, the frame in the position E is pushed to the declivity 248 and runs down thereon by its own weight until it reaches the position B. In this manner, the frames can be recycled in order. In this device, however, it is preferable to provide a stopper 250 near the top of the declivity 248 which temporarily holds the frame 86 and an air or oil cylinder 252 release the stopper 250 after the action of the frame-moving air or oil cylinder 158 has been finished so that the frame 86 can run down on the declivity to the vacant position B. At least two frames may always be stored behind the stopper 250, so that one frame may periodically be released at a time. In this embodiment, somewhat strong pushing force is required for the frame-moving air or oil cylinder 158 for punching forward (toward right in the figure) a number of the frames on the acclivity.

In FIG. 24-c is shown still another example which is devised to reduce unnecessary load on the frame-moving air or oil cylinder 158. The rails ahead of the position C are given a declivity 254 which may be so steep or slight that the frames can or cannot run down by their own weight. If the declivity is so steep as to permit the frames 86 to run down by their own weight, the frame-moving air or oil cylinder 158 may be a weak one which can move only the flames in the positions B and C, but these should preferably be provided a stopper 258 operated by an air or oil cylinder 256 in front of the declivity to prevent any unexpected advancing movement of the frame 86 in the position C or the one immediately in front thereof, lest the frame 86 transferred from the position B to the position C should overrun on account of the pulling force by the preceding frames. At the lower end of the declivity, there should preferably be provided a stopper 250 which controls the advance of the empty frames 86 from which the leader 2 has been removed. Even if the declivity 254 is so slight that the frames 86 cannot run down by their own weight, the load to the frame-moving air or oil cylinder 158 can be remarkably reduced so that the stopper 256 is not required. In front of the position E, however, the declivity should preferably be steep enough to permit the frames 86 to run down spontaneously by their own weight.

As the frames 86 go down in this device, there must be provided a special device to return the frames 86 to the position B, even if the rails 106 are arranged in the form of a loop.

In FIG. 24-c, there are provided a steep acclivity 260 continuous from the lower end of the declivity 254 of the rails 106 and a slight declivity 262 from the top of the acclivity 260 to the backside of the position B. Incidentally, a backsliding-preventing stopper 264 is provided at the lower end of the declivity 254, while an ail or oil cylinder 266 and a chain conveyor 268 having at least one nail 274 and suspended on a pair of sprockets 270 and 272, are provided along the steep acclivity 260. When the stopper 250 is released, the lowest frame 86 runs down along the declivity by its own weight and enters the acclivity past the backsliding-preventing stpper 264, by its own inertia. On the acclivity, the speed of the running frame 86 quickly slows down and the frame moves backward and is once stopped by the backsliding-preventing stopper 264. In the next step, the frame 86 is pushed up to the halfway of the acclivity 260 by the action of an air or oil cylinder 266 and then lifted to the top of the acclivity by a nail 274 of the moving chain conveyor 268. The frame then enters the declivity 262 through which it runs down by itself to the position B. The declivity 262 itself is optional and may be omitted. In the latter case, the frame 86 may be moved from the top of the acclivity 260 to the position B the rails between which are horizontal by using an air or oil cylinder 140 provided above the acclivity 260, as shown in FIG. 24-d.

It is also possible, as shown in FIG. 24-d, to provide a horizontal part 276 in the cooling zone D, the length of the horizontal part being equal to that of a few frames. The remaining part of the cooling zone D is made gradient to form a declivity 254 on which the frames 86 can run down by their own weight. In this case, the frames 86 in the horizontal part function as a buffer and prevent the frame 86 in the position C from being pulled forward (rightward in the figure).

If necessary, the number of frames 86 to be included in the apparatus can be increased or decreased by providing a declivity 254 ahead of the position C as shown in FIGS. 24-c and 24-d. If the frame 4 is small and is cooled quickly, the apparatus can be made smaller by shifting the position E backward (leftward in the figure) and removing the frames ahead thereof. If the cooling operation requires a long period of time, the cooling distance in the zone D can be made longer by using more frames and shifting the position E forward (rightward in the figure).

The melt of a synthetic resin used for molding the float 4 is necessarily incorporated with a foaming agent. If desired, however, auxiliary additives utilizable for conventional injection molding operations such as an inorganic filler and/or a pigment may be added in a proper amount to the melt of a synthetic resin.

The cork line of the present invention can be used in various fileds in addition to fisheries. For example, the cork line can be used as course rope in swimming pools, a sliding-preventing knot rope for the purpose of mountaineering or rescue. For these purposes, the size of floats and the intervals thereof can properly be changed.

As many apparently widely different embodiments of this invention may be made without departing from the spirit and scope thereof, it is to be construed that this invention is not limited to the specific embodiments thereof except as defined in the appended claims.

What is claimed is:

1. A process for producing cork lines which comprises sequentially stretching portions of at least one flexible leader at definite intervals and having definite lengths, to prevent contraction thereof, introducing said stretched portions intermittently into at least one molding cavity each of which is defined by a pair of closed metal molds and wherein the stretched portions pass through the cavity and are held by furrows at the junctional surface edges of said molds, injecting a molten synthetic thermoplastic resin containing a foaming agent into said mold cavity and around said leader where said resin is molded and foamed to form a float fixed around said leader, removing the float from the closed molds by opening said molds after at least the surface of said float has been cooled, cooling the interior of said float while maintaining said leader in a stretched state to prevent shrinkage thereof, and releasing said leader from the stretched state.

2. The process of claim 1, wherein said synthetic thermoplastic resin is polyethylene.

3. The process of claim 1, wherein said synthetic thermoplastic resin is a mixture of medium or high-density polyethylene and ethylene-vinyl acetate copolymer.

4. The process of claim 1, wherein the leader is made of a fibrous material.

5. The process according to claim 1, wherein a plurality of frames are aligned along a given path, and said stretched portions of said leader within each of said frames, and said leader is intermittently conveyed by moving said frames intermittently along said path.

6. The process according to claim 5 wherein said frames are conveyed along rails provided along said path.

7. The process according to claim 5 wherein the interval between said floats fixed by molding to said leader is controlled by controlling the interval between said frames when said leader is fixed to said frames in the stretched state.

8. The process according to claim 5 wherein the interval between said floats fixed by molding to said leader is controlled by providing a surplus of a definite length of said leader between said frame to which said leader is to be fixed in stretched state and the adjacent frame.

9. The process according to claim 5 wherein said leader which is stretched parallel to and in front of said frame, is fixed to said frame by pushing said frame forward until it touches said leader.

10. The process according to claim 5 wherein said leader which is stretched parallel to and in front of said frame is fixed to said frame by bringing said leader into close contact with said frame while pushing said leader onto said frame.

11. The process according to claim 5 wherein one of said metal mold is stationary and the other of said metal molds is movable and surround said leader stretched on said frame when closed, and said movable metal mold is moved forward and together with said stationary metal mold to close said metal molds and at the same time said frame is moved forward, thereby holding said leader stretched on said frame between said two metal molds at the junctional surface thereof.

12. The process according to claim 5 wherein said metal molds are provided on both sides of said frame and are moved closer to said frame and eventually are closed in the plane of said leader which is stretched on said frame to hold said leader between said metal molds.

13. The process according to claim 5 wherein said leader is stretched between said metal molds when they are in the open state, said metal molds are then closed, said float is fixed by molding to said leader within said metal molds, and said leader extending out of said metal molds is fixed to said frame.

14. The process according to claim 5 wherein said float removed from said metal molds has previously been held within and cooled by cooling the metal molds.

15. The process according to claim 5 wherein said float is fixed by molding to said leader stretched across said frame, said metal molds are shifted along with said frame without opening said metal molds, said float is removed from said metal molds after at least the surface of said float has been cooled, and then said metal molds are returned to a given position of said injection molding machine.

16. The process according to claim 5 wherein the interior of said float removed from said metal molds is cooled by a cold blast of air.

17. The process according to claim 6 wherein one of said frames is moved by said leader to push all the frames disposed ahead of it thereof while pulling all the frames disposed in the rear thereof.

18. The process according to claim 17 wherein the frame which is moved first is the one sent to said injection molding machine.

19. The process according to claim 5 wherein two leaders are stretched across said frame and a float is fixed by molding to each one of said leaders.

* * * * *

UNITED STATES PATENT AND TRADEMARK OFFICE
CERTIFICATE OF CORRECTION

PATENT NO. : 4,152,798
DATED : May 8, 1979
INVENTOR(S) : Akaura et al

It is certified that error appears in the above-identified patent and that said Letters Patent are hereby corrected as shown below:

IN THE HEADING:

Change the first name of the first inventor from "Seshiro" to --Seishiro--.

Signed and Sealed this

Thirteenth Day of November 1979

[SEAL]

Attest:

RUTH C. MASON
Attesting Officer

LUTRELLE F. PARKER
Acting Commissioner of Patents and Trademarks